(12) United States Patent
Verghade et al.

(10) Patent No.: US 9,719,634 B2
(45) Date of Patent: Aug. 1, 2017

(54) DEVICE FOR FEEDING FUEL GAS TO AN APPLICATION

(71) Applicant: L'Air Liquide, Société Anonyme pour l'Etude et l'Exploitation des Procédés Georges Claude, Paris (FR)

(72) Inventors: Jean-Marie Verghade, Saint Martin d'Uriage (FR); Guillaume Roberge, Maubec (FR); Patrick Bacot, Meudon (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 260 days.

(21) Appl. No.: 14/442,231

(22) PCT Filed: Oct. 10, 2013

(86) PCT No.: PCT/FR2013/052423
§ 371 (c)(1),
(2) Date: May 12, 2015

(87) PCT Pub. No.: WO2014/072597
PCT Pub. Date: May 15, 2014

(65) Prior Publication Data
US 2016/0265721 A1    Sep. 15, 2016

(30) Foreign Application Priority Data
Nov. 12, 2012    (FR) ..................................... 12 60724

(51) Int. Cl.
*B65B 1/30* (2006.01)
*F17C 7/00* (2006.01)
(Continued)

(52) U.S. Cl.
CPC .............. *F17C 7/00* (2013.01); *F17C 13/025* (2013.01); *F17C 13/026* (2013.01); *F17C 13/04* (2013.01);
(Continued)

(58) Field of Classification Search
CPC ........ F17C 7/00; F17C 13/025; F17C 13/026; F17C 13/04; G01L 19/083; G01L 19/0084; G01L 19/086
See application file for complete search history.

(56) References Cited

U.S. PATENT DOCUMENTS

2009/0040049 A1* 2/2009 Delecourt ............... F17C 5/002
340/572.4
2011/0247424 A1    10/2011 Mayr et al.

FOREIGN PATENT DOCUMENTS

| EP | 1 988 327 | 11/2008 |
|---|---|---|
| WO | WO 2008 139081 | 11/2008 |
| WO | WO 2010 069707 | 6/2010 |

OTHER PUBLICATIONS

French Search Report and Written Opinion for corresponding FR 1260724, Jul. 12, 2013.
(Continued)

*Primary Examiner* — Jason K Niesz
(74) *Attorney, Agent, or Firm* — Elwood L. Haynes

(57) ABSTRACT

Device for feeding fuel gas to an application (6), the device comprising at least one fuel gas bottle (1) furnished with a tap (2), and a bleed-off apparatus (4, 13) comprising an electronic logic unit (9) and a bleed-off outlet (4) selectively connectable to the tap (2), the bleed-off outlet (4) being linked (5) fluidically to an application (6) receiving the fuel gas originating from the bottle (1), the tap (2) comprising an electronic manometer (3) for measuring the pressure in the bottle (1), the electronic manometer (3) being devoid of battery and comprising an inductive member (7) for wire- (Continued)

lessly transmitting to the electronic logic unit (9) information relating to the measured pressure, characterized in that the bleed-off apparatus (4, 13) also comprises an inductive member (8) powered electrically by the electronic logic unit (9) and in that, when the bleed-off outlet (4) is connected up to the tap (2), the inductive member (8) of the bleed-off outlet (4) is situated in a manner adjacent to the inductive member (7) of the manometer (3) so as to ensure electrical power supply of the manometer (3) by inductive coupling.

13 Claims, 2 Drawing Sheets

(51) Int. Cl.
　　　*G01L 19/08*　　　(2006.01)
　　　*F17C 13/02*　　　(2006.01)
　　　*F17C 13/04*　　　(2006.01)
　　　*G01L 19/00*　　　(2006.01)
(52) U.S. Cl.
　　　CPC ........ *G01L 19/0084* (2013.01); *G01L 19/083* (2013.01); *G01L 19/086* (2013.01); *F17C 2205/0323* (2013.01); *F17C 2221/012* (2013.01); *F17C 2250/043* (2013.01); *F17C 2250/0439* (2013.01); *F17C 2265/06* (2013.01)

(56) References Cited

OTHER PUBLICATIONS

International Search Report and Written Opinion for corresponding PCT/FR2013/052423, Feb. 12, 2014.

\* cited by examiner

DEVICE FOR FEEDING FUEL GAS TO AN APPLICATION

CROSS REFERENCE TO RELATED APPLICATIONS

This application is a 371 of International PCT Application PCT/FR2013/052423 filed Oct. 10, 2013 which claims priority to French Patent Application No. 1260724 filed Nov. 12, 2012, the entire contents of which are incorporated herein by reference.

BACKGROUND

The present invention relates to a device for feeding fuel gas.

SUMMARY

The invention relates more particularly to a device for feeding fuel gas, notably hydrogen, to an application, the device comprising at least a cylinder of pressurized fuel gas fitted with a tap provided for filling the cylinder and drawing off gas from it, and a draw-off apparatus comprising an electronic logic unit and a draw-off outlet selectively connectable to the tap for drawing off fuel gas from the cylinder, the draw-off outlet being fluidly connected to an application receiving the fuel gas obtained from the cylinder, the tap comprising an electronic pressure gauge for measuring the pressure in the cylinder, the electronic pressure gauge having no batteries and comprising an inductive element such as a coil for wirelessly transmitting data relating to the measured pressure to the electronic logic unit.

The invention relates, notably, to the measurement of pressure in a gas cylinder by means of an electronic pressure gauge mounted on a tap.

There is a known way of providing an electrical power supply to an electrical pressure gauge using a battery or a wire. However, the use of batteries requires replacements which are poorly compatible with the service life of pressure gauges. The use of a wired power supply is often incompatible with applications using flammable gases, such as hydrogen for example.

The document WO2008139081A2 describes an example of a wireless electronic pressure gauge of this type.

One object of the present invention is to propose a device for feeding fuel gas which is fitted with an electronic pressure gauge that overcomes some or all of the above drawbacks.

To this end, the device according to the invention, which in other respects matches the generic definition provided in the preamble above, is essentially characterized in that the draw-off apparatus also comprises an inductive element, such as an antenna, electrically powered by the electronic logic unit when the draw-off outlet is connected to the tap, the inductive element of the draw-off outlet being located adjacent to the inductive element of the pressure gauge to provide an electrical power supply to the pressure gauge by inductive coupling.

Embodiments of the invention may also have one or more of the following characteristics:
- the inductive element of the draw-off apparatus is located at the draw-off outlet,
- the electronic logic unit is configured to cause the pressure gauge to be switched on when an inductive coupling is present between the inductive element of the draw-off outlet and the inductive element of the pressure gauge, and in response to the switching on of the pressure gauge the inductive element of the pressure gauge sending an electrical signal to the electronic logic unit via the inductive element of the draw-off outlet, thereby forming a system for detecting the state of connection of the draw-off outlet to the tap,
- the electronic logic unit is configured to receive from, and/or transmit to, the pressure gauge data relating to the physical or identification characteristics of the cylinder via the coupling of the inductive elements,
- the draw-off outlet and the tap comprise combined mechanical attachment elements to provide a stable, removable mechanical connection between the filling outlet and the tap,
- the filling outlet comprises a draw-off conduit having a first end selectively connected to a gas outlet of the tap and a second end connected to the application, said draw-off outlet comprising a valve controlled by the electronic logic unit,
- the draw-off apparatus comprises, positioned on the draw-off conduit, at least one of a temperature sensor and a pressure sensor; the at least one sensor being connected to the electronic logic unit and controlled by the latter,
- the draw-off outlet comprises an actuator operated by an electromagnet for selectively opening a valve of the tap, the electromagnet being connected to the electronic logic unit,
- the electronic logic unit is connected to at least one network or electrical bus,
- the device comprises a plurality of draw-off apparatus, connected in series to the same application,
- the pressure gauge comprises an electrical circuit connected electrically to the inductive element, the electrical circuit comprising, connected in series, a rectifier element such as a diode, and a capacitor, for the purpose of, respectively, converting part of the electrical field received by the inductive element into electric current, and storing this current,
- the pressure gauge comprises a display unit and a control logic unit connected to the electrical circuit and selectively supplied with current by the capacitor,
- the display unit is of the bistable type, that is to say one providing an indication of a physical quantity, such as pressure, in a permanent manner without requiring a continuous electrical power supply,
- the pressure gauge comprises a pressure sensor of the electrical type, connected to the electrical circuit.

The invention may also relate to any alternative device or method comprising any combination of the characteristics described above or below.

BRIEF DESCRIPTION OF THE DRAWINGS

Other particular features and advantages will be apparent from the following description, provided with reference to the figures, of which.

DESCRIPTION OF PREFERRED EMBODIMENTS

Figure 1:
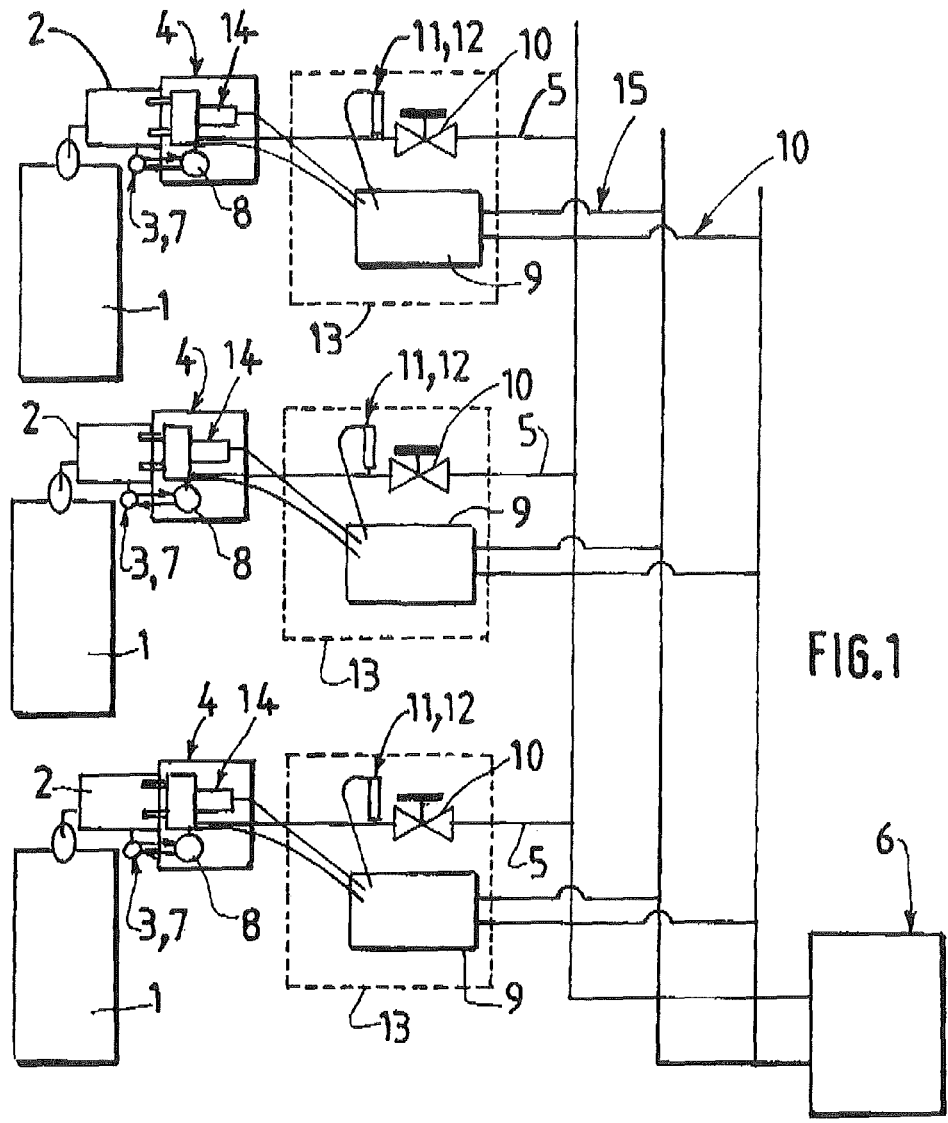
FIG. 1 shows a schematic partial view of the structure and operation of an example of a device for feeding gas according to a first exemplary embodiment of the invention.

The fuel gas feed installation shown in FIG. 1 comprises three gas feed devices which supply the same application 6 in parallel.

For example, the application 6 comprises a fuel cell, the fuel gas being gaseous hydrogen.

Each of the three gas feed devices comprises a pressurized gas cylinder 1 fitted with a tap 2 provided for filling and drawing off the cylinder 1 and a draw-off apparatus 4, 13 connected to the cylinder. Preferably, the tap 2 comprises a pressure reducer.

Each draw-off apparatus 4, 13 comprises an electronic logic unit 9 and a draw-off outlet 4 selectively connectable to the tap 2 of the corresponding cylinder 1, for drawing off fuel gas from the cylinder 1. Each draw-off outlet 4 is fluidly connected 5 to the application 6, which receives the fuel gas obtained from the cylinder 1 via a conduit 5.

The tap 2 of each cylinder 1 comprises an electronic pressure gauge 3 for measuring the pressure in the cylinder 1. The electronic pressure gauge 3 has no battery and comprises an inductive element 7 such as a coil for wirelessly transmitting data relating to the pressure measured in the cylinder 1 to the corresponding electronic logic unit 9.

According to an advantageous feature, the draw-off outlet 4 also comprises an inductive element 8 such as an antenna supplied with electrical power by the electronic logic unit 9. Additionally, when the draw-off outlet 4 is connected to the tap 2, the inductive element 8 of the draw-off outlet 4 is located adjacent to the inductive element 7 of the pressure gauge 3 to provide an electrical power supply to the pressure gauge 3 by inductive coupling. The two inductive elements 7, 8 operate, for example, by exchanging radio signals, using for example the technology of radio frequency identification (abbreviated to "RFID" in English).

Each inductive element 7, 8 may comprise, for example, an electronic chip connected to a transmitting/receiving antenna.

The electronic logic unit 9 is preferably configured to cause the pressure gauge 3 to be switched on by inductive coupling between the inductive element 8 of the draw-off outlet 4 and the inductive element 7 of the pressure gauge 3. Thus, in response to the switching on of the pressure gauge 3, the inductive element 7 of the pressure gauge 3 preferably sends an electrical signal to the electronic logic unit 9 via the inductive element 8 of the draw-off outlet 4, thereby forming a system for detecting the state of connection of the draw-off outlet 4 to the tap 2 of a cylinder 1.

The pressure gauge 3 may further comprise a manually operable button, the actuation of which supplies mechanical energy, converted (magnetically, for example) to electrical energy, to supply the pressure gauge 2.

Clearly, the draw-off outlet 4 and the tap 2 preferably comprise combined mechanical attachment elements to provide a selective fluid connection between the filling outlet 4 and a gas outlet opening of the tap 2.

In addition to the pressure data, the electronic logic unit 9 may be configured to receive from, and/or transmit to, the pressure gauge 3 data relating to the physical or identification characteristics of the cylinder 1 via the coupling of the inductive elements 7, 8. For example, the electronic logic unit may receive or transmit data relating to the monitoring of the quality of the cylinder 1 and/or its contents.

Each filling outlet 4 comprises, for example, a draw-off conduit 5 having a first end selectively connected to a gas outlet of the tap 2 and a second end connected to the application 6. Each draw-off conduit 5 preferably comprises a valve 10 controlled by the electronic control unit 9.

Preferably, each draw-off apparatus 4, 13 also comprises a temperature sensor 11 and a pressure sensor 12, positioned on the draw-off conduit 5 and connected to the corresponding electronic logic unit 9.

Additionally, as shown in FIG. 1, each draw-off outlet 4 may comprise an actuator operated by an electromagnet 14 for selectively opening a valve of the tap 2. The electromagnet 14 is preferably connected to, and controlled by, the electronic logic unit 9.

The electronic logic units 9 of the various draw-off apparatus 4, 13 may be connected to an electrical power supply network 15 and to a data exchange network 16.

Figure 2:
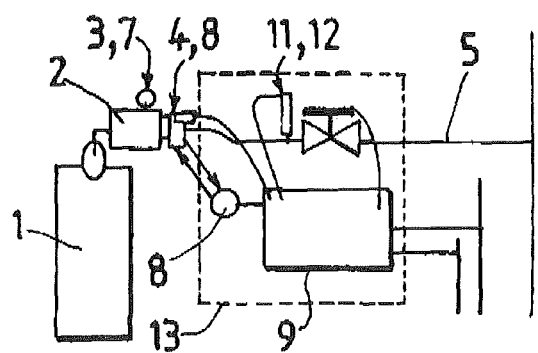
FIG. 2 shows a schematic partial view of the structure and operation of a second example of a device for feeding gas according to the invention.

FIG. 2 shows a variant embodiment of a gas feed device which differs from the devices of FIG. 1 solely in that the inductive activation element 8 is located on the draw-off apparatus 13 incorporating the electronic logic unit, instead of on the draw-off outlet 4. Since the other components are unchanged, they are identified by the same reference numerals and are not described for a second time.

Figure 3:
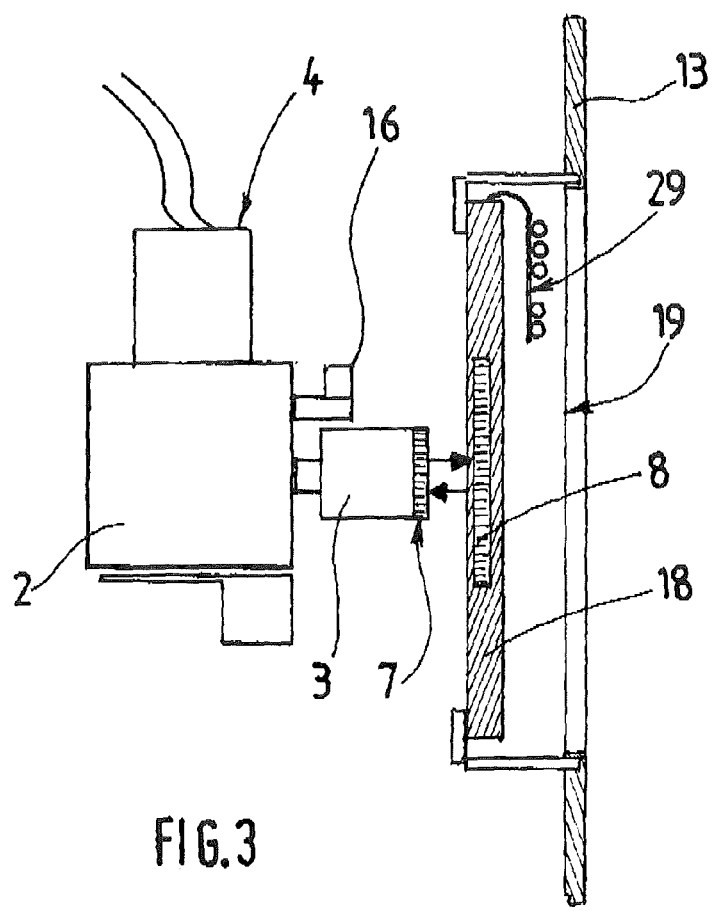
FIG. 3 shows a schematic partial view of the structure and operation of a third example of a device for feeding gas according to the invention.

In the illustration of FIG. 3, the tap 2 comprises a manually operable lever 16 for causing, for example, the opening or closure of an internal valve. A draw-off outlet 4 is connected to the tap 2. In this connected position, the inductive element 7 of the pressure gauge 3 is located facing an inductive element 8 of the draw-off apparatus 13 which is partially shown. The inductive element 8 of the draw-off apparatus 13 is, for example, carried by a support plate 18 fixed at an opening 19 of a casing of the draw-off apparatus 13. Additionally, this support plate 18 may be connected to electronic circuitry 29 and/or to a human-machine interface.

Figure 4:
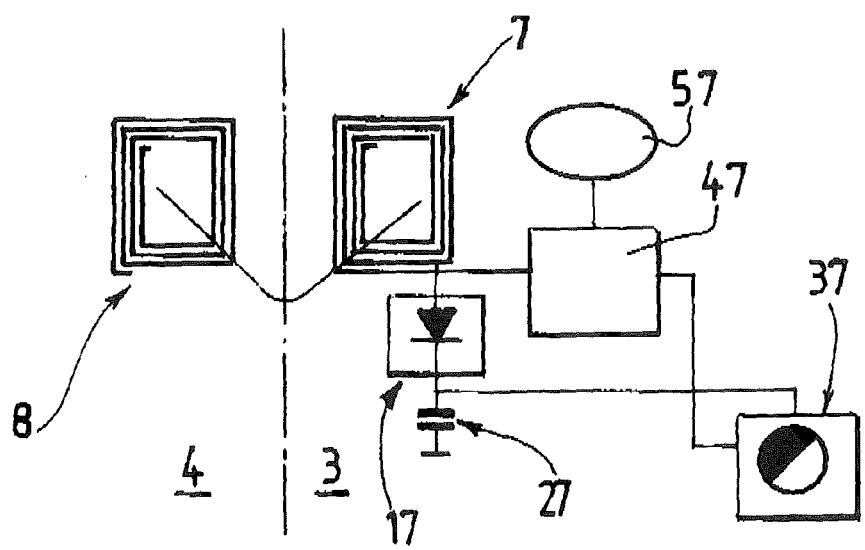
FIG. 4 shows a schematic partial view of a possible example of an electrical structure of the pressure gauge according to the invention.

FIG. 4 shows, by way of example, a possible electrical configuration of the pressure gauge 3. The pressure gauge 3 comprises an electrical circuit including, for example, a pressure sensor 57 connected to an electronic logic unit 47 (for example a processor).

The electrical circuit of the pressure gauge 3 comprises, connected in series, a rectifying element 17 such as a diode and a capacitor 27. One end of the rectifying element 17 is connected to the inductive element 7 to enable part of the electrical field received by the inductive element 7 to be converted to electric current. The capacitor 27 can be used to store this current.

The circuit of the pressure gauge 3 also comprises, for example, a display unit 37 connected electrically, on the one hand, to the electronic logic unit 47, and, on the other hand, between the rectifying element 17 and the capacitor 27. Thus the display unit 37 may be supplied with current that has been produced and stored.

Preferably, the display unit 37 is of the LCD type and is bistable, that is to say one providing an indication of a physical quantity, such as pressure, in a permanent manner without requiring a continuous electrical power supply.

Thus, when the inductive element 8 (antenna) of the filling outlet 4 is coupled to the inductive element 8 (antenna) of the pressure gauge 3, an exchange of electromagnetic waves is carried out (using RFID technology, for example).

In particular, the transmitting antenna 8 transmits an electromagnetic field which is captured by the antenna 7 of the pressure gauge 3 fixed to the reservoir 1. This enables power to be supplied to the electronic logic unit 47 which measures the pressure via the sensor 57, while also enabling the data to be transmitted from this unit.

On each interrogation, part of the electromagnetic field received by the receiving antenna 7 is converted to current and is stored by the assembly formed by the rectifier 4 and capacitor 5. In addition to its use for pressure measurement (sensor 57), this electrical energy may be used for changing the state of a bistable indicator 7 of the display unit 37 (and/or any other electrical element). This element 37 may be, for example, an electromagnetic device, a bistable LCD display unit, or a device of the electronic paper ("e-paper") type. To facilitate the energy transfer, the antennas 7 and 8 are preferably placed facing one another when the reservoir 1 is connected to the draw-off installation. The data reading sequences may be designed to enable sufficient energy to be accumulated to cause the indicator 37 to switch its state, for example by making the electronic logic unit 47 read the voltage from the capacitor 5.

Clearly, the inductive coupling system and the corresponding receiving circuit as claimed and described, notably with reference to FIG. 4, may be applied to any other type of application, in addition to that described above by way of example. This system may include, in particular, an interrogating inductive element 8 which can be coupled to a receiving inductive element 7. The receiving inductive element 7 is connected electrically to an electrical circuit comprising, connected in series, a rectifier element 17 such as a diode and a capacitor 27, for the purpose of, respectively, converting part of the electrical field received by the inductive element 7 into electric current, and storing this current for the purpose of supplying one or more electrical elements 37, 47, 57, at least one of which may operate in a bistable manner.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device for feeding fuel gas to an application, comprising;
   at least one cylinder of pressurized fuel gas fitted with a tap provided for filling the cylinder and drawing off gas from it, and
   a draw-off apparatus comprising an electronic logic unit and a draw-off outlet selectively connectable to the tap to draw off fuel gas from the cylinder,
      the draw-off outlet being fluidly connected to an application receiving the fuel gas obtained from the cylinder,
      the tap comprising an electronic pressure gauge for measuring the pressure in the cylinder,
      the electronic pressure gauge having no batteries and comprising an inductive element for wirelessly transmitting data relating to the measured pressure to the electronic logic unit
   wherein the draw-off apparatus further comprises an inductive element electrically powered by the electronic logic unit, and in that, when the draw-off outlet is connected to the tap,
      the inductive element of the draw-off outlet is located adjacent to the inductive element of the pressure gauge to provide an electrical power supply to the pressure gauge by inductive coupling, and
      the inductive element of the draw-off apparatus being located at the draw-off outlet.

2. The device as claimed in claim 1, wherein the electronic logic unit is configured to cause the pressure gauge to be switched on when an inductive coupling is present between the inductive element of the draw-off outlet and the inductive element of the pressure gauge, and, in response to the switching on of the pressure gauge, the inductive element of the pressure gauge sends an electrical signal to the electronic logic unit via the inductive element of the draw-off outlet, thereby forming a system for detecting the state of connection of the draw-off outlet to the tap.

3. The device as claimed in claim 1, wherein the electronic logic unit is configured to receive from, and/or transmit to, the pressure gauge data relating to the physical or identification characteristics of the cylinder via the coupling of the inductive elements.

4. The device as claimed in claim 1, wherein the draw-off outlet and the tap comprise combined mechanical attachment elements to provide a stable, removable mechanical connection between the filling outlet and the tap.

5. The device as claimed in claim 1, wherein the filling outlet comprises a draw-off conduit having a first end selectively connected to a gas outlet of the tap and a second end connected to the application, said draw-off outlet comprising a valve controlled by the electronic logic unit.

6. The device as claimed in claim 5, wherein the draw-off apparatus comprises, positioned on the draw-off conduit, at least one of a temperature sensor and a pressure sensor; the at least one sensor being connected to the electronic logic unit and controlled by the latter.

7. The device as claimed in claim 1, wherein the draw-off outlet comprises an actuator operated by an electromagnet for selectively opening a valve of the tap, and in that the electromagnet is connected to the electronics logic unit.

8. The device as claimed in claim 1, wherein the electronic logic unit is connected to at least one electrical network or bus.

9. The device as claimed in claim 1, further comprising a plurality of draw-off apparatus connected in series to the same application.

10. The device as claimed in claim 1, wherein the pressure gauge comprises an electrical circuit connected electrically to the inductive element, the electrical circuit comprising, connected in series, a rectifier element, and a capacitor, for the purpose of, respectively, converting part of the electrical field received by the inductive element into electric current, and storing this current.

11. The device as claimed in claim 10, wherein the pressure gauge comprises a display unit and a control logic unit connected to the electrical circuit and selectively supplied with current by the capacitor.

12. The device as claimed in claim 11, wherein the display unit) is of the bistable type, thereby providing an indication of a physical quantity in a permanent manner without requiring a continuous electrical power supply.

13. The device as claimed in claim 10, wherein the pressure gauge comprises a pressure sensor of the electrical type, connected to the electrical circuit.

* * * * *